United States Patent
Burba et al.

(10) Patent No.: US 10,798,147 B2
(45) Date of Patent: Oct. 6, 2020

(54) CONSTRAINT BASED CONTROLLED SEEDING

(71) Applicant: Microsoft Technology Licensing, LLC, Redmond, WA (US)

(72) Inventors: Alexander Burba, Seattle, WA (US); Brandon T. Hunt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 15/199,971

(22) Filed: Jun. 30, 2016

(65) Prior Publication Data
US 2018/0006895 A1    Jan. 4, 2018

(51) Int. Cl.
*H04L 29/08* (2006.01)
*G06F 12/0866* (2016.01)
*H04L 12/24* (2006.01)

(52) U.S. Cl.
CPC .......... *H04L 67/06* (2013.01); *G06F 12/0866* (2013.01); *H04L 41/12* (2013.01); *H04L 67/104* (2013.01); *H04L 67/1044* (2013.01); *H04L 67/18* (2013.01)

(58) Field of Classification Search
CPC ... H04L 67/06; H04L 67/104; H04L 67/1044; H04L 67/1063; H04L 67/1076; H04L 29/06; H04L 9/32; H04L 63/0442; H04L 63/08; H04L 63/102; G11B 20/10527; D01D 5/423; D01F 6/625; G06F 16/9566; G06F 12/0866
USPC .......................................................... 709/228
See application file for complete search history.

(56) References Cited

U.S. PATENT DOCUMENTS

| | | |
|---|---|---|
| 8,413,198 B2 | 4/2013 | Connor et al. |
| 8,606,846 B2 | 12/2013 | Czechowski, III et al. |
| 8,935,315 B2 | 1/2015 | Hudson et al. |
| 9,037,657 B2 | 5/2015 | Nieh et al. |

(Continued)

OTHER PUBLICATIONS

Peterson, et al., "Antfarm: Efficient Content Distribution with Managed Swarms", In Proceedings of the 6th USENIX symposium on Networked systems design and implementation, Apr. 22, 2009, pp. 1-28.

(Continued)

*Primary Examiner* — Kyung H Shin
(74) *Attorney, Agent, or Firm* — Alleman Hall Creasman & Tuttle LLP

(57) ABSTRACT

In one example, a peer-to-peer network may use partial seeding to increase the number of seed devices available to a peer device acting as a leeching device. A catalog service may maintain an active peer list for a peer-to-peer network describing active peer devices. The catalog service may track a data file composed of a set of sub-pieces for the peer-to-peer network. The catalog service may identify a device constraint for a peer device of the peer-to-peer network describing a characteristic of the peer device impacting an ability of the peer device to store a sub-piece of the data file. The catalog service may assign a seed sub-piece of the data file based on the device constraint to the peer device when executing a seed client to provide the seed sub-piece to a leeching client on the peer-to-peer network. The catalog service may direct the peer device to retain a persistent sub-piece on the peer device as the seed sub-piece for the peer device until a release event.

18 Claims, 14 Drawing Sheets

(56) References Cited

U.S. PATENT DOCUMENTS

| | | |
|---|---|---|
| 9,294,580 B2 | 3/2016 | Morrison, III et al. |
| 2003/0204602 A1* | 10/2003 | Hudson .................. H04L 67/06 709/228 |
| 2004/0098533 A1* | 5/2004 | Henshaw ............ G06F 12/0866 711/100 |
| 2005/0268102 A1* | 12/2005 | Downey .................. H04L 9/32 713/176 |
| 2006/0117025 A1* | 6/2006 | Kaler .................... H04L 67/104 |
| 2009/0132524 A1* | 5/2009 | Stouffer ................ G06F 16/951 |
| 2010/0121828 A1 | 5/2010 | Wang |
| 2011/0125849 A1 | 5/2011 | Boyd et al. |
| 2011/0320594 A1 | 12/2011 | Zanger et al. |
| 2012/0143986 A1 | 6/2012 | Robinson et al. |
| 2012/0233228 A1* | 9/2012 | Barton .................... H04L 67/06 707/827 |
| 2012/0233293 A1 | 9/2012 | Barton et al. |
| 2012/0311010 A1 | 12/2012 | Shah |
| 2013/0111513 A1 | 5/2013 | Gaude |
| 2013/0244624 A1 | 9/2013 | Das et al. |
| 2014/0172971 A1 | 6/2014 | Akkurt et al. |
| 2014/0172972 A1 | 6/2014 | Burba et al. |
| 2015/0189011 A1 | 7/2015 | Hunt et al. |
| 2015/0213484 A1* | 7/2015 | Amara ............... G06Q 30/0246 705/14.45 |

OTHER PUBLICATIONS

Sweha, et al., "Angels in the Cloud a Peer-Assisted Bulk-Synchronous Content Distribution Service", In Proceedings of IEEE International Conference on Cloud Computing, Jul. 4, 2011, pp. 1-8.

Fei, et al., "A Segmentation-Based Fine-Grained Peer Sharing Technique for Delivering Large Media Files in Content Distribution Networks", In Journal of IEEE Transactions on Multimedia vol. 8, Issue 4, Aug. 2006, pp. 821-829.

Xu, Kunjie., "Performance Modeling of BitTorrent Peer-to-Peer File Sharing", In Journal of Computing Research Repository, Nov. 2013, pp. 1-23.

"International Search Report and Written Opinion Issued in PCT Application No. PCT/US2017/038884", dated Sep. 4, 2017, 10 Pages.

"Office Action Issued in European Patent Application No. 17735726.6", dated Apr. 24, 2020, 3 Pages.

* cited by examiner

| DEVICE ID 510 | TIME 520 | LOCATION 530 | PROXIMITY 540 | HARDWARE CONSTRAINT 550 | ARTIFICIAL CONSTRAINT 560 | |
|---|---|---|---|---|---|---|
| | | | | | USER 562 | NETWORK 564 |

*500*
Figure 5

| FILE ID 610 | FILE SIZE 620 | SUB-PIECE INDEX 630 | DEVICE ID 640 | LOCATION 650 | PROXIMITY 660 |
|---|---|---|---|---|---|
| | | | DEVICE ID 640 | LOCATION 650 | PROXIMITY 660 |
| | | SUB-PIECE INDEX 630 | DEVICE ID 640 | LOCATION 650 | PROXIMITY 660 |
| | | | DEVICE ID 640 | LOCATION 650 | PROXIMITY 660 |

Figure 6
600

CONSTRAINT BASED CONTROLLED SEEDING

BACKGROUND

A user device may download a data file over a data network from a content store operated at a server. A data file may be a text document, a digital image, an audio file, a video file, or an executable. For a large amounts of data, transferring a data file over the data network may severely restrict data flow, resulting in slow download times. To avoid these obstacles, a user device may join a peer-to-peer network. In a peer-to-peer network, the user device is connected to multiple devices on an equal basis, rather than connecting to a single device on a server-client basis. Each peer device in the peer-to-peer network may have a complete copy of the data file. The user device may download portions of the data file from the multiple peer device. By using multiple sources with multiple data channels, the user device may speed up download times for large files.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to using partial seeding in a peer-to-peer network to increase the number of seed devices available to a peer device acting as a leeching device. A catalog service may maintain an active peer list for a peer-to-peer network describing active peer devices. The catalog service may track a data file composed of a set of sub-pieces for the peer-to-peer network. The catalog service may identify a device constraint for a peer device of the peer-to-peer network describing a characteristic of the peer device impacting an ability of the peer device to store a sub-piece of the data file. The catalog service may assign a seed sub-piece of the data file based on the device constraint to the peer device when executing a seed client to provide the seed sub-piece to a leeching client on the peer-to-peer network. The catalog service may direct the peer device to retain a persistent sub-piece on the peer device as the seed sub-piece for the peer device until a release event.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 5 illustrates, in a block diagram, one example of an active peer record.

FIG. 6 illustrates, in a block diagram, one example of a file record.

DETAILED DESCRIPTION

Figure 1:
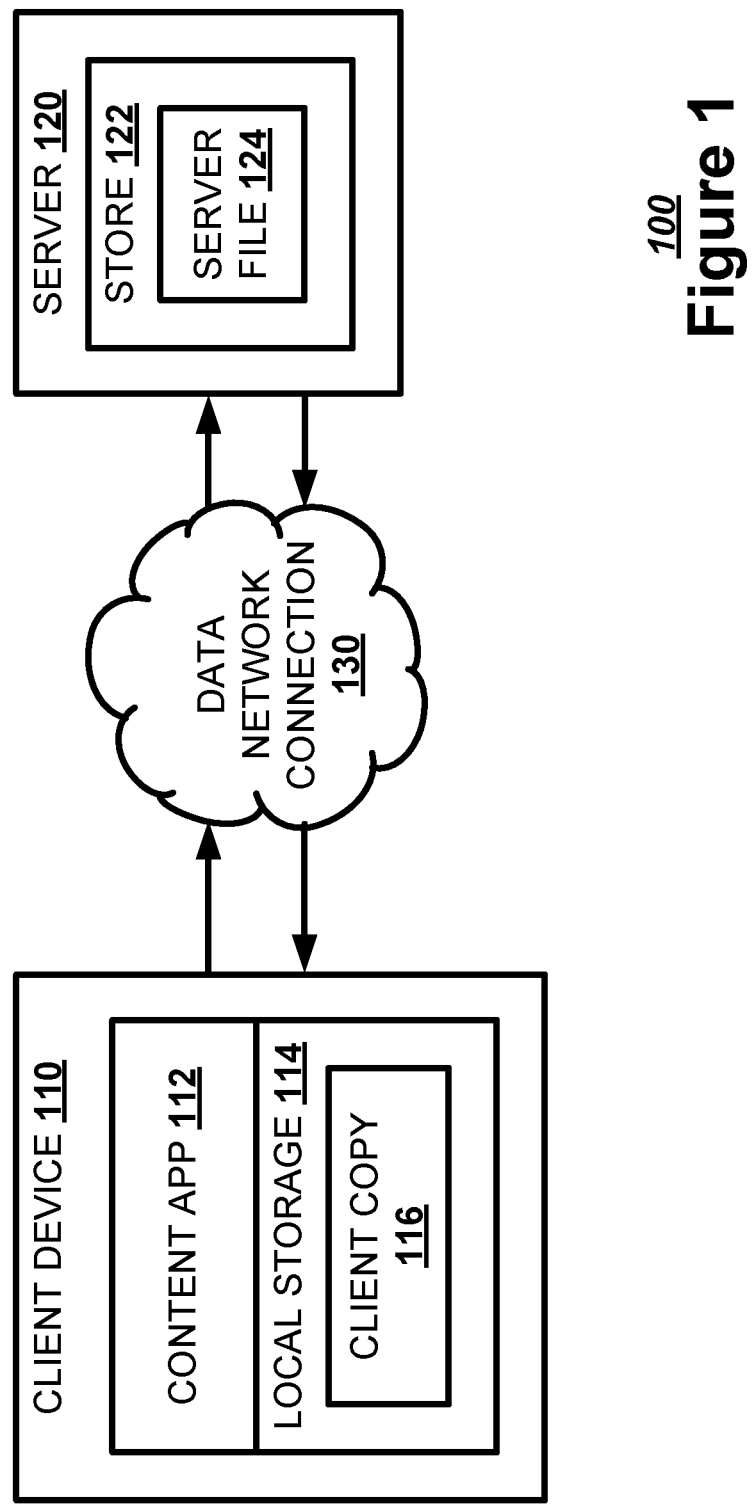
FIG. 1 illustrates, in a block diagram, one example of a content network.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a catalog service, a computing device, or a machine-implemented method.

In one example, a peer-to-peer network may use partial seeding to increase the number of seed devices available to a peer device acting as a leeching device. A catalog service may maintain an active peer list for a peer-to-peer network describing active peer devices. The catalog service may track a data file composed of a set of sub-pieces for the peer-to-peer network. The catalog service may identify a device constraint for a peer device of the peer-to-peer network describing a characteristic of the peer device impacting an ability of the peer device to store a sub-piece of the data file. The catalog service may assign a seed sub-piece of the data file based on the device constraint to the peer device when executing a seed client to provide the seed sub-piece to a leeching client on the peer-to-peer network. The catalog service may direct the peer device to retain a persistent sub-piece on the peer device as the seed sub-piece for the peer device until a release event.

In a traditional content delivery system using peer-to-peer networks, a peer device acting as a seed device may store a complete copy of the data file being provided. If the user decides to purge the data file from the peer device, that peer device may no longer be used as a seed device to deliver content. The user may choose not to allow the content delivery system to store the complete copy on the peer device strictly for the purposes of acting as a seed device for other content recipients.

By storing a small sub-piece of the data file, more peer devices may be used as seed devices. The seed clients on the seed devices may use a small amount of resources to seed content. The catalog service for the content delivery system may use information about a current state of a peer device to optimize the set of peer devices used as seed devices. For example, the catalog service may factor in the sub-pieces downloaded by the peer device. Further, the catalog service may factor in various device constraints in selecting both the sub-pieces retained as well as the number of sub-pieces retained on each seed device.

The catalog service may track the client topology of each peer device. The catalog service may further track a geographical network, an internet service provider, and autonomous system numbers for the peer-to-peer network. The catalog service may factor client resource properties for a seed device when instructing a peer device to retain a sub-piece of a data file. The catalog service may use this information to ensure an adequate distribution of sub-pieces and seed devices in the peer-to-peer network. The catalog service may control the level of redundancy per sub-piece in a given subnet. The catalog service may leverage subnet information to achieve an optimal connection between peer devices.

FIG. 1 illustrates, in a block diagram, one example of a content network 100. A user may use a client device 110 that executes a content application 112 to access a content server 120 executing a content store 122 via a data network connection 130. The client device 110 may be a desktop computer, a laptop computer, a tablet, a smart phone, a dedicated media player, or a gaming console. The data network connection 130 may be an Internet connection, a wide area network connection, a local area network connection, or other type of data network connections. The content store 122 may store a server data file 124, such as a text file, an image file, an audio file, a video file, or an executable file. The content server 120 may be implemented on a single server or a distributed set of servers, such as a server farm. The content store 122 may divide the server data file 124 into a set of packets for transmission on the data network connection 130. The client device 110 may sequentially download the set of packets composing the server data file 124 over the data network connection 130. The client device 110 may store the server data file 124 in a local data storage 114 as a client copy 116 reconstituted from the set of packets.

Figure 2:
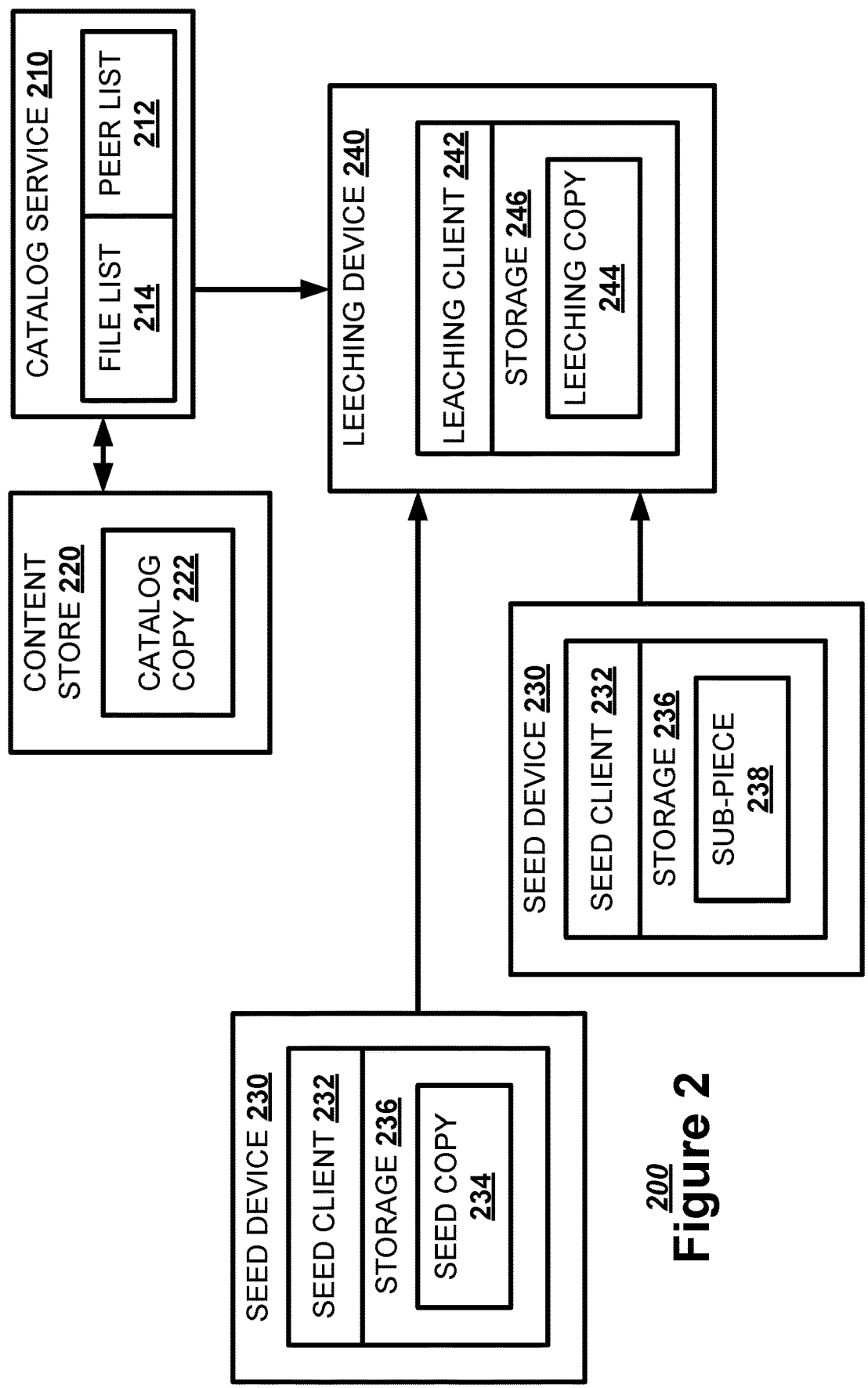
FIG. 2 illustrates, in a block diagram, one example of a peer-to-peer network.

The server store-client device process for transferring a data file may be both slow and resource intensive. An alternate approach may be to use a peer-to-peer network. FIG. 2 illustrates, in a block diagram, one example of a peer-to-peer network 200. A catalog service 210 may maintain an active peer list 212 to track active peer devices in the peer-to-peer network 200. The catalog service 210 further may maintain a file list 214 to track any data files stored in the peer devices of the peer-to-peer network 200. The catalog service 210 may have an associated content store 220 to store a catalog copy 222 of the data file.

The catalog service 210 may use the file list 214 to track which active peer devices in the peer-to-peer network 200 are storing a copy of the data file. The catalog service 210 may divide the data file into a set of sub-pieces. The sub-pieces may be of varying sizes or may be of equal size. The file list 214 may track the size of the data file, as well as the number of sub-pieces composing the data file. The file list 214 may identify the active peer devices that store a copy of the data file. Each active peer device may act as a seed device 230. A seed device 230 is a peer device in the peer-to-peer network 200 that provides a copy of one or more sub-pieces of the data file to other devices in the peer-to-peer network 200. Each seed device 230 may execute a seed client 232 to connect to the peer-to-peer network. The seed client 232 may store a complete seed copy 234 of the data file in a seed storage device 236 of the seed device 230. The seed client 232 may transmit one or more sub-pieces of the complete seed copy 234 over the peer-to-peer network 200.

The catalog service 210 may identify a set of one or more seed devices 230 of the peer-to-peer network 200 to a leeching device 240 of the peer-to-peer network 200. A leeching device 240 is a peer device in the peer-to-peer network that is receiving a copy of the data file from the seed devices 230. A peer device may be both a leeching device 240 and a seed device 230 depending on circumstances. The leeching device 240 may execute a leeching client 242 to connect to the peer-to-peer network 200. The leeching client 242 may collect the sub-pieces of the data file from the one or more seed devices 230 on the peer-to-peer network 200. The leeching client 242 may merge the sub-pieces into a leeching copy 244 of the data file in a leeching storage 246 of the leeching device 240.

In order to encourage more users of peer devices to act as a seed device 230, the seed client 232 may store just a sub-piece 238 or a few sub-pieces 238 on the seed device 230 rather than a complete seed copy 234. If the data file is not in active use by the peer device, the seed device 232 may still seed the leeching device 240 with just the sub-piece 238 or sub-pieces 238. The catalog service 210 may use the file list 214 to track which seed devices 230 are storing which sub-pieces 238. The catalog service 210 may then alert the leeching device 240 as to which seed devices 230 from which to collect sub-pieces 238. Further, the catalog service 210 may assign specific sub-pieces 238 to specific seed devices 230 to assure a reasonable coverage area to provide those sub-pieces 238 to a leeching device 240.

Figure 3:
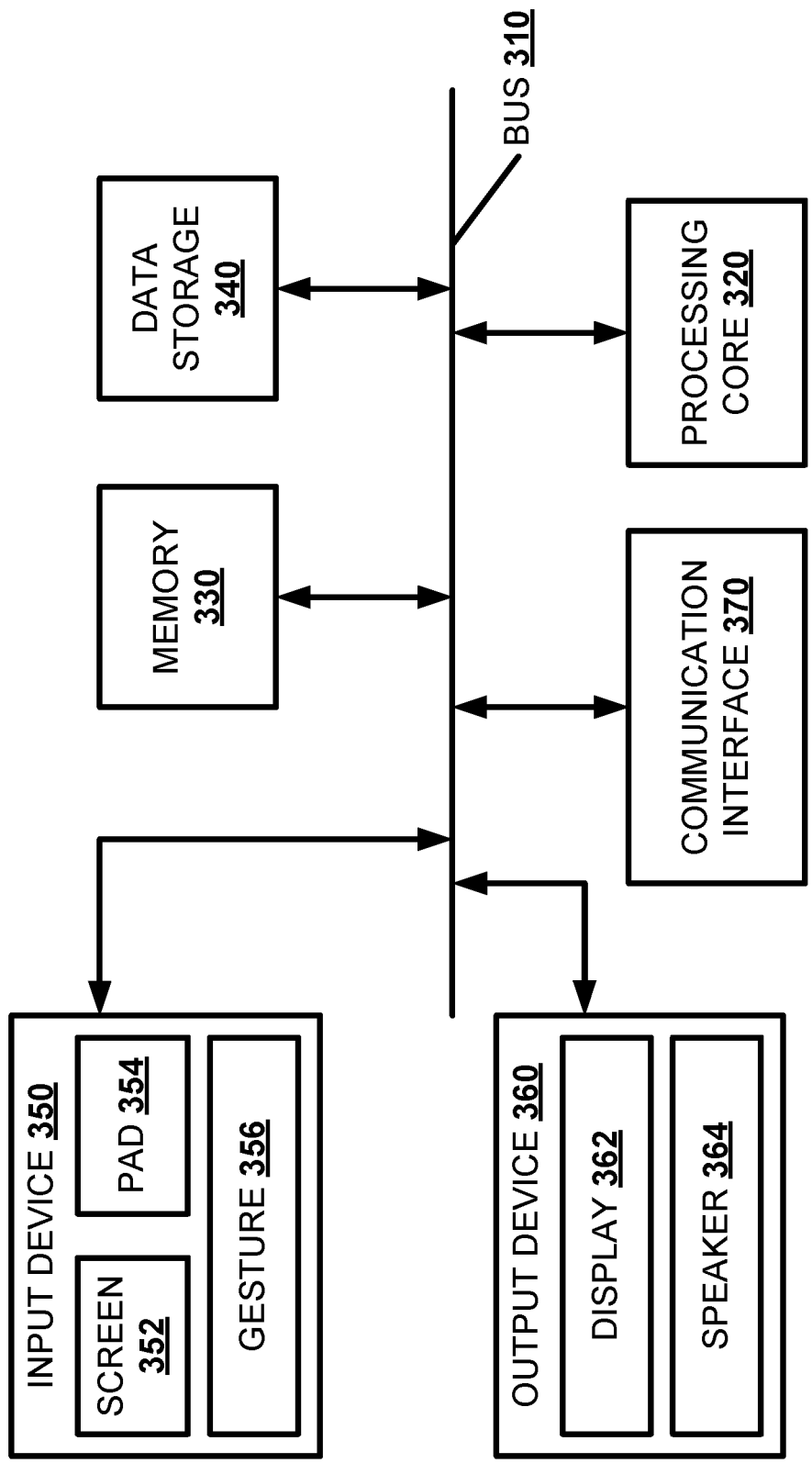
FIG. 3 illustrates, in a block diagram, one example of a computing device.

FIG. 3 illustrates a block diagram of an exemplary computing device 300 which may act as a catalog service or a peer device. The computing device 300 may combine one or more of hardware, software, firmware, and system-on-a-chip technology to implement a catalog service or a peer device. The computing device 300 may include a bus 310, a processing core 320, a memory 330, a data storage 340, an input device 350, an output device 360, and a communication interface 370. The bus 310, or other component interconnection, may permit communication among the components of the computing device 300.

The processing core 320 may include at least one conventional processor or microprocessor that interprets and executes a set of instructions. The processing core 320 may be configured to identify a device constraint for a peer device of a peer-to-peer network describing a characteristic of the peer device impacting an ability of the peer device to store a sub-piece of the data file. The processing core 320 may be further configured to determine a hardware constraint of the peer device describing at least one of memory, hard disk specification, and network bandwidth as a device constraint. The processing core 320 may be additionally configured to assign a network service constraint based on a geographic region.

The processing core 320 may be also configured to assign a seed sub-piece of the data file based on the device constraint to the peer device when executing a seed client to provide the seed sub-piece to a leeching client on the peer-to-peer network. The processing core 320 may be further configured to assign an ephemeral sub-piece as a candidate for overwriting based on the device constraint. The set of sub-pieces may be of equal data size. The processing core 320 may be configured to group a seed subset of sub-pieces of the data file to identify for the peer device to retain based on a device constraint. The processing core 320 may be additionally configured to group an ephemeral subset of sub-pieces of the data file as candidates for overwriting by the peer device based on a device constraint. The processing core 320 may be also configured to select the seed sub-piece based on a network proximity of the leeching client. The processing core 320 may be further configured to assign a redundancy level for the seed sub-piece based on a network proximity of the leeching client. The processing core 320 may be additionally configured to factor a network subnet into selecting the seed sub-piece. A network subnet may be a local area network, a personal area network, or other localized network.

The memory 330 may be a random access memory (RAM) or another type of dynamic data storage that stores information and instructions for execution by the processor 320. The memory 330 may also store temporary variables or other intermediate information used during execution of instructions by the processor 320. The memory 330 may be configured to store a series of instructions that are executed by at least one processor to implement a catalog service application. The memory 330 may be configured to maintain an active peer list for a peer-to-peer network describing active peer devices. The memory 330 may be further configured to remove the peer device from an active seed list for the peer-to-peer network when no active alert has been received within an active period. The memory 330 may be additionally configured to remove the peer device from an active seed list for the peer-to-peer network when outside a region window for a geographic region for the peer device. The memory 330 may be also configured to track a data file composed of a set of sub-pieces for the peer-to-peer network. The memory 330 may be further configured to maintain a network service constraint as an artificial constraint for the peer device.

The data storage 340 may include a conventional ROM device or another type of static data storage that stores static information and instructions for the processor 320. The data storage 340 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 340 may store a set of instructions detailing a method that when executed by one or more processors cause the one or more processors to perform the method. The data storage 340 may also be a database or a database interface for storing data files.

The input device 350 may include one or more conventional mechanisms that permit a user to input information to the computing device 300, such as a keyboard, a mouse, a voice recognition device, a microphone, a headset, a touch screen 352, a touch pad 354, a gesture recognition device 356, etc. The output device 360 may include one or more conventional mechanisms that output information to the user, including a display screen 362, a printer, one or more speakers 364, a headset, a vibrator, or a medium, such as a memory, or a magnetic or optical disk and a corresponding disk drive.

The communication interface 370 may include any transceiver-like mechanism that enables computing device 300 to communicate with other devices or networks. The communication interface 370 may include a network interface or a transceiver interface. The communication interface 370 may be a wireless, wired, or optical interface. The communication interface 370 may be further configured to receive an active alert from a peer device in a peer-to-peer network indicating that the peer device is active. The communication interface 370 may be also configured to receive a data file request from the peer device for the data file. The communication interface 370 may be further configured to identify to the peer device a set of seed clients on a peer subset of peer devices of the peer-to-peer network to acquire the data file. The communication interface 370 may be additionally configured to receive an artificial constraint from an external source to the peer device. The communication interface 370 may be also configured to receive from the peer device a user input describing a user constraint as an artificial constraint for the peer device. The communication interface 370 may be configured to direct the peer device to retain a persistent sub-piece on the peer device as the seed sub-piece for the peer device until a release event.

The computing device 300 may perform such functions in response to the processing core 320 executing sequences of instructions contained in a computer-readable medium, such as, for example, the memory 330, a magnetic disk, or an optical disk. Such instructions may be read into the memory 330 from another computer-readable medium, such as the data storage 340, or from a separate device via the communication interface 360.

Figure 4:
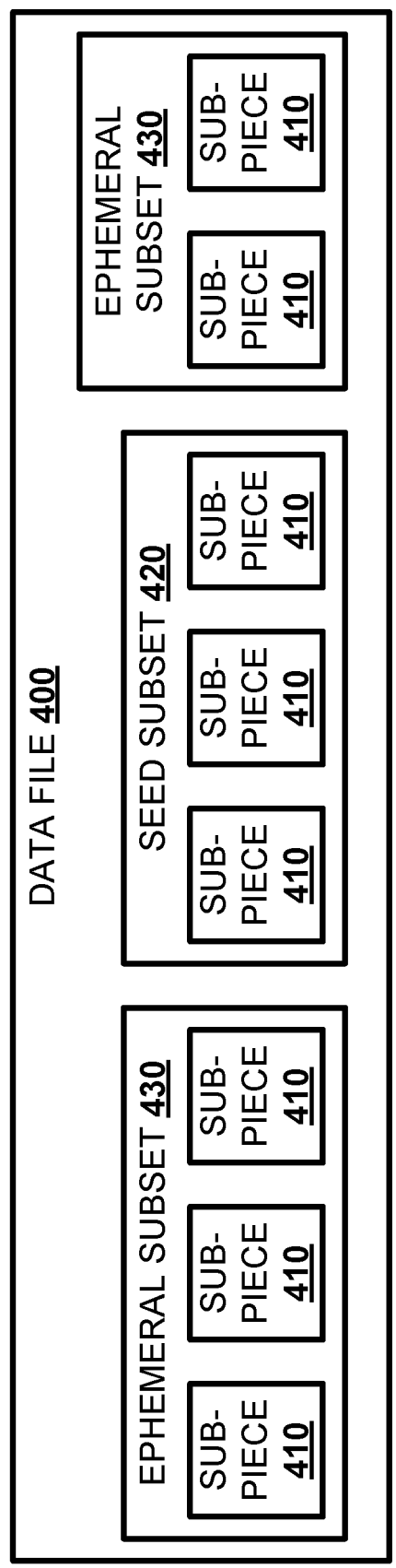
FIG. 4 illustrates, in a block diagram, one example of a data file.

The peer-to-peer may transmit the data file to a leeching device as a set of sub-pieces. FIG. 4 illustrates, in a block diagram, one example of a data file 400. The catalog service may divide a data file 400 into multiple sub-pieces 410. The catalog service may divide the data file 400 into sub-pieces 410 of the same data size or of varying sizes. Alternately, a peer device in the peer-to-peer network may divide the data file 410 into sub-pieces 410 and may communicate the division architecture to the catalog service.

For each peer device receiving a copy of the data file in the peer-to-peer network, the catalog service may assign a subset of the sub-pieces 410 to be a seed subset 420 of sub-pieces. A seed device may retain the seed subset 420 of sub-pieces even after the data file has been deleted. The seed device may store the seed subset 420 until a release event occurs. A release event may be the expiration of a release period, a release directive from the catalog service, a seed subset 420 reassignment from the catalog service, or a seed device event, such as a system crash.

A seed device may infer that a sub-piece that is not a member of the seed subset 420 is a member of an ephemeral set 430 of sub-pieces. The ephemeral subset 430 of sub-pieces may be a candidate for overwriting when the data file 400 is deleted. Alternately, the catalog service may explicitly assign a sub-piece 410 to be a member of the ephemeral subset 430. The catalog service may rank members of the ephemeral subset 430, with certain sub-pieces being overwritten first, based on the proximity of a different seed device that is persisting that sub-piece as a member of a seed subset 420. For such actions, the seed client may track which sub-pieces 410 have been overwritten and update the catalog service with each active alert indicating the seed device is active.

FIG. 5 illustrates, in a block diagram, one example of an active peer record 500. The active peer record 500 may have a device identifier 510 indicating the peer device the active peer record is referencing. The active peer record 500 may have a timestamp 520 indicating the time since the catalog service has received an active alert from the peer device indicating that the peer device is active. The active peer record 500 may have a location field 530 describing a location of the peer device, either geographically or within a network. The active peer record 500 may have a proximity score 540 describing the proximity of other peer devices in the peer-to-peer network to the peer device identified in the active peer record 500. The proximity score 540 may be based on data transmission time between two peer devices. The active peer record 500 may have a hardware constraint field 550 describing any hardware constraints imposed by the peer device, such as memory, a hard disk specification, or a network bandwidth. The active peer record 500 may have an artificial constraint field 560 describing a constraint applied from a source external to the peer device. The artificial constraint field 560 may have a user sub-field 562 describing a user constraint received in a user input. For example, while the peer device may have 8 gigabytes of data storage available, the user may limit the data storage available to the seed client to 4 gigabytes. The artificial constraint field 560 may have a network service constraint sub-field 564 describing a policy applied by the network service. For example, the catalog service may prohibit usage of a seed client within a given time period.

FIG. 6 illustrates, in a block diagram, one example of a file record 600. The file record 600 may have a file identifier (ID) 610 indicating the data file being described in the record. The file record 600 may have a file size field 620, describing the size of the file in bytes or in the number of sub-pieces of the file for purposes of peer-to-peer transmission. The file record 600 may have sub-piece index 630 identifying a sub-piece of the data file. Each sub-piece may be associated with one or more device identifiers 640 indicating peer devices that are persisting in storing that sub-piece as a part of a seed subset. Each device identifier 640 may be associated with a location field 650 describing a location of the peer device, either geographically or within a network. Each device identifier 640 may be associated with a proximity score 660 describing the proximity of other seed devices persisting in storing complementary seed sub-pieces. A complementary seed sub-piece is a seed sub-piece that is not a part of the seed subset of the peer device indicated by the associated device identifier 640.

Figure 7:
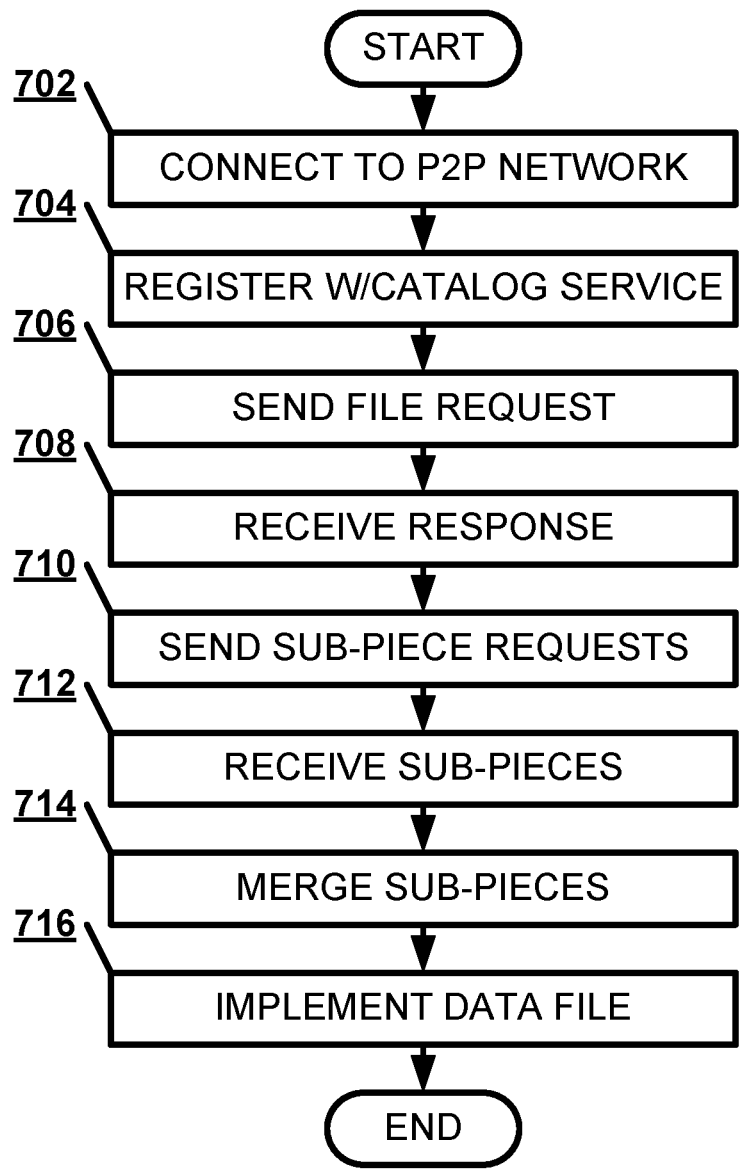
FIG. 7 illustrates, in a flowchart, one example of a method of accessing a data file using a peer device.

A standard peer-to-peer network may facilitate a user device in quickly accessing a large data file. FIG. 7 illustrates, in a flowchart, one example of a method 700 of accessing a data file using a peer device on a peer-to-peer network. The peer device may connect to a peer-to-peer (P2P) network (Block 702). The peer device may register with a catalog service that manages a data file composed of a set of sub-pieces for the peer-to-peer network (Block 704). The peer device may send a data file request to the catalog service for the data file (Block 706). The peer device may receive a file request response describing a set of seed client identifiers for a peer subset of peer devices of the peer-to-peer network to acquire the data file (Block 708). The peer device may send a sub-piece request to each peer device in the peer subset requesting a sub-piece of the data file stored in the peer device (Block 710). The peer device may receive the sub-pieces of the data file from the peer subset (Block 712). The peer device may merge the sub-pieces of the data file into a local copy of the data file (Block 714). The peer device may implement the local copy of the data file, either by executing an executable file or presenting a media or text file (Block 716).

Figure 8:
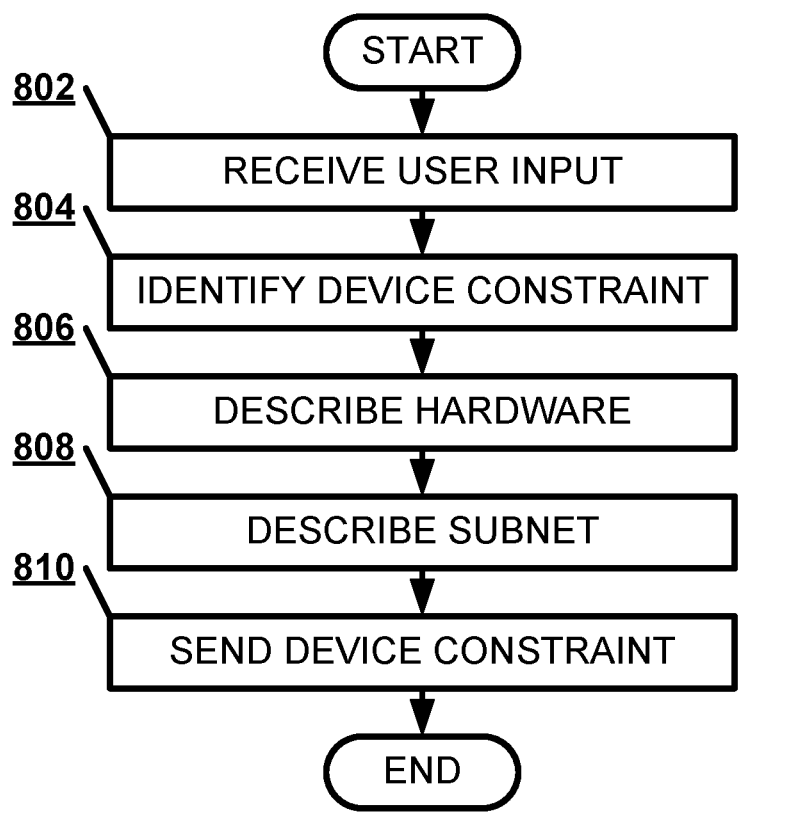
FIG. 8 illustrates, in a flowchart, one example of a method of establishing device constraints for a peer device.

A peer-to-peer network may increase access to a data file by increasing the number of peer devices acting as a seed device by limiting the amount of the data file stored in each seed device. To determine the number of sub-pieces of the data file to store on the seed device, the catalog service may establish device constraints on the peer device. FIG. 8 illustrates, in a flowchart, one example of a method 800 of establishing device constraints for a peer device. The peer device may receive a user input describing a user constraint as an artificial constraint for the peer device (Block 802). The peer device may identify to the catalog service a device constraint for the peer device impacting an ability of the peer device to store a sub-piece of the data file (Block 804). The peer device may provide a hardware constraint of the peer device describing at least one of memory, a hard disk specification, and network bandwidth to the catalog service (Block 806). The peer device may describe a network subnet for the peer device to the catalog service (Block 808). The peer device may send the device constraint to the catalog service (Block 810).

Figure 9:
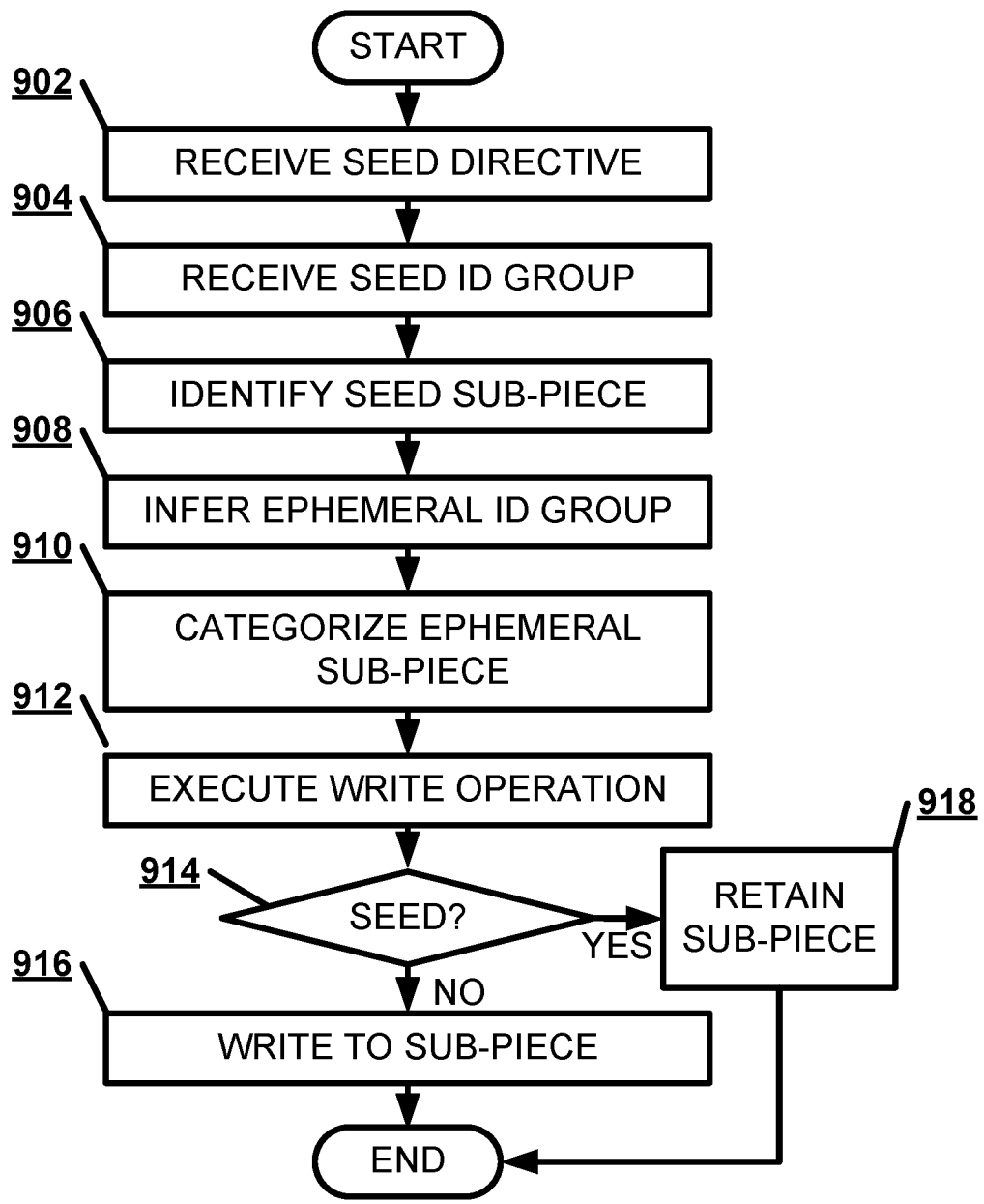
FIG. 9 illustrates, in a flowchart, one example of a method of managing a seed subset on a peer device.

FIG. 9 illustrates, in a flowchart, one example of a method 900 of managing a seed subset on a peer device. The peer device may receive as part of a file request response a seed directive from a catalog service indicating seed sub-pieces of the data file for the peer device when executing a seed client (Block 902). The peer device may receive a seed identifier group for a seed subset of sub-pieces of the data file to identify for the peer device to retain in storage based on a device constraint (Block 904). The peer device may identify a persistent sub-piece on the peer device as the seed sub-piece of the data file for the seed client (Block 906). The peer device may infer an ephemeral subset of sub-pieces of the data file as candidates for overwriting by the peer device (Block 908). The peer device may categorize an ephemeral sub-piece of the data file as a candidate for overwriting when function as the seed client (Block 910). The peer device may execute a write operation causing part of the data storage used to store the data file to be overwritten (Block 912). If a sub-piece has been categorized as an ephemeral sub-piece (Block 914), the peer device may write to the storage location of the sub-piece (Block 916). If a sub-piece has been categorized as a seed sub-piece (Block 914), the peer device may retain the seed sub-piece (Block 918).

Figure 10:
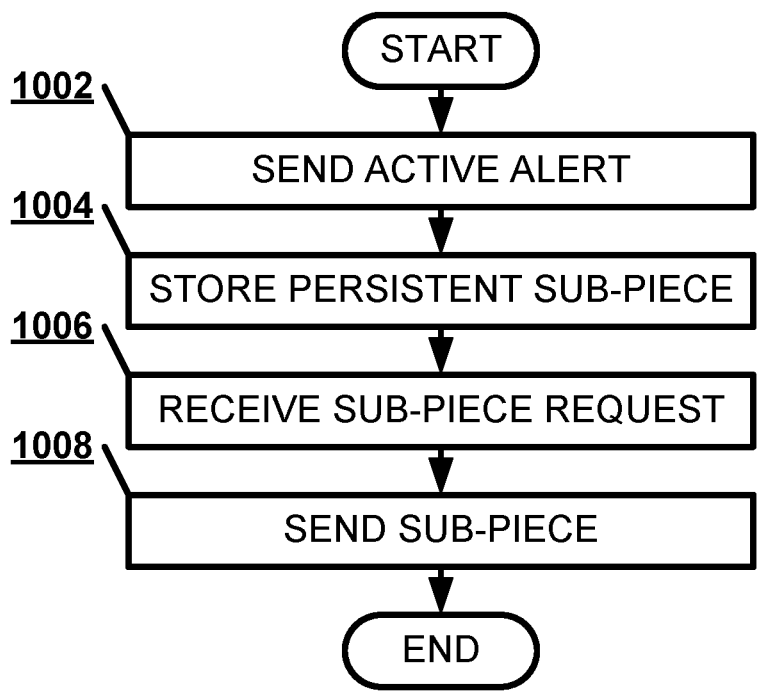
FIG. 10 illustrates, in a flowchart, one example of a method of executing a seed client on a peer device.

FIG. 10 illustrates, in a flowchart, one example of a method 1000 of executing a seed client on a peer device. The peer device may send an active alert to the catalog service indicating that the peer device is active (Block 1002). The peer device may store a persistent sub-piece on the peer device as the seed sub-piece of the data file for the seed client (Block 1004). The peer device may receive a sub-piece request for a seed sub-piece stored on the peer device from a leeching device (Block 1006). The peer device may send the seed sub-piece to the leeching device over the peer-to-peer network (Block 1008).

Figure 11:
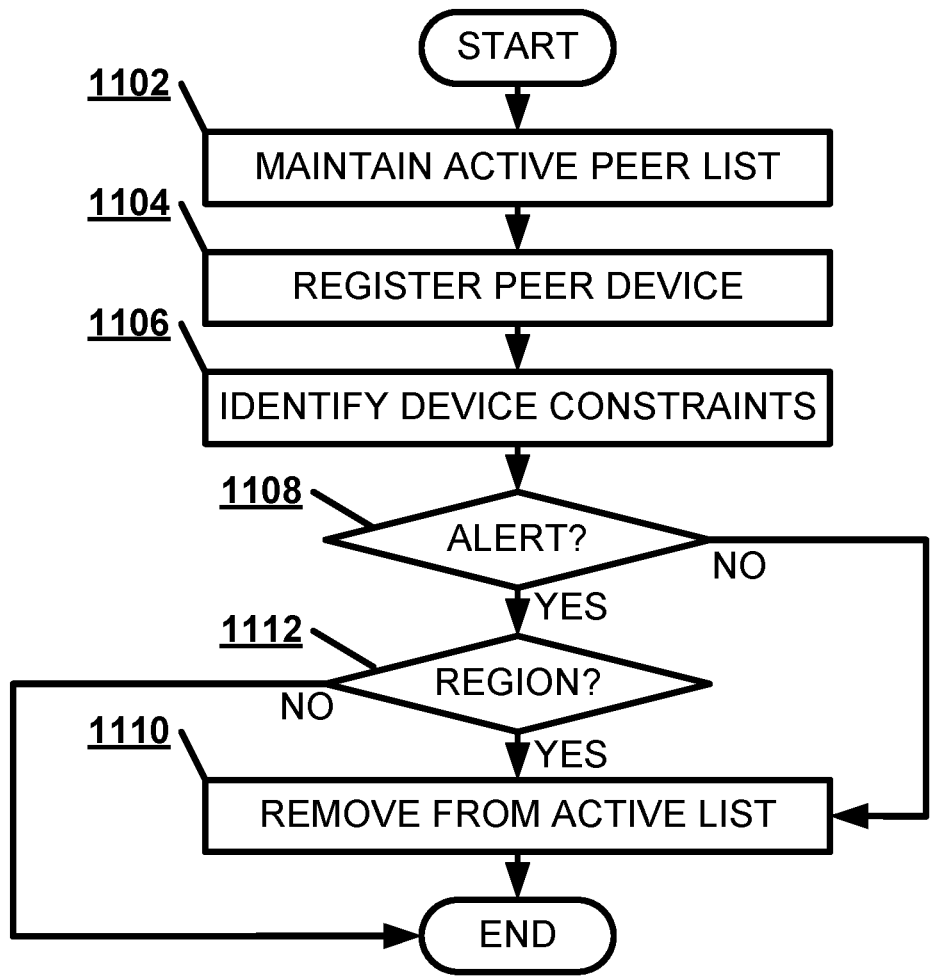
FIG. 11 illustrates, in a flowchart, one example of a method of managing an active peer list on a catalog service.

FIG. 11 illustrates, in a flowchart, one example of a method 1100 of managing an active peer list on a catalog service. The catalog service may maintain an active peer list for a peer-to-peer network describing active peer devices (Block 1102). The catalog service may register a peer device as being an active peer device executing a seed client (Block 1104). The catalog service may identify a device constraint for the peer device executing the seed client (Block 1106). If the catalog service has not received an active alert from the peer device indicating that the peer device is active within an active period (Block 1108), the catalog service may remove the peer device from an active seed list for the peer-to-peer network when no active alert has been received within an active period (Block 1110). If the catalog service determines that the peer device is outside a region window for a geographic region for the peer device (Block 1112), the catalog service may remove the peer device from an active seed list for the peer-to-peer network when outside a region window for a geographic region for the peer device (Block 1110). A region window describes a period of time that a peer device may be active within a geographic region, either based on network service policy or local laws.

Figure 12:
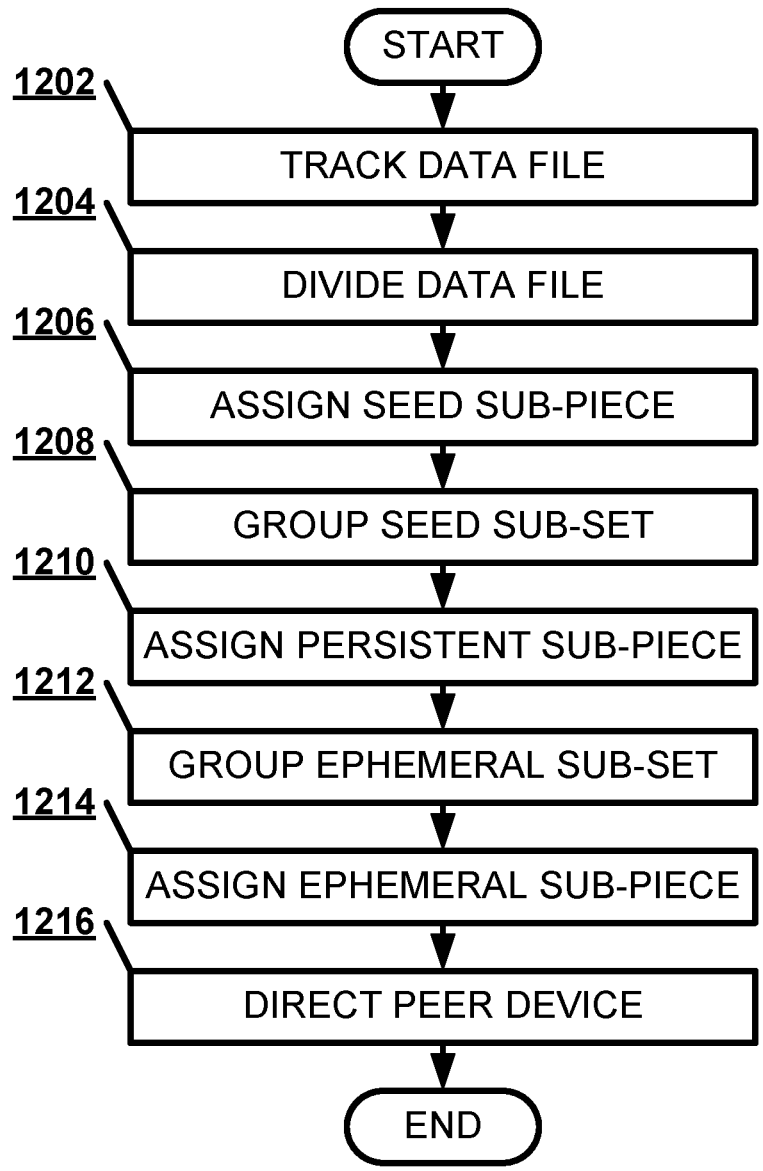
FIG. 12 illustrates, in a flowchart, one example of a method of tracking a data file on a catalog service.

FIG. 12 illustrates, in a flowchart, one example of a method 1200 of tracking a data file on a catalog service. The catalog service may track a data file composed of a set of sub-pieces for the peer-to-peer network (Block 1202). The catalog service may divide the data file into the set of sub-pieces such that the sub-pieces of are of equal data size (Block 1204). The catalog service may assign a seed sub-piece of the data file to a peer device of the peer-to-peer network when executing a seed client to provide the seed sub-piece to a leeching client on the peer-to-peer network (Block 1206). The catalog service may group a seed subset of sub-pieces of the data file to identify for the peer device to retain based on a device constraint (Block 1208). The catalog service may assign the persistent sub-piece based on the device constraint (Block 1210). The catalog service may group an ephemeral subset of sub-pieces of the data file as candidates for overwriting by the peer device based on a device constraint (Block 1212). The catalog service may assign an ephemeral sub-piece based on the device constraint (Block 1214). The catalog service may direct the peer device to retain a persistent sub-piece on the peer device as the seed sub-piece for the peer device (Block 1216).

Figure 13:
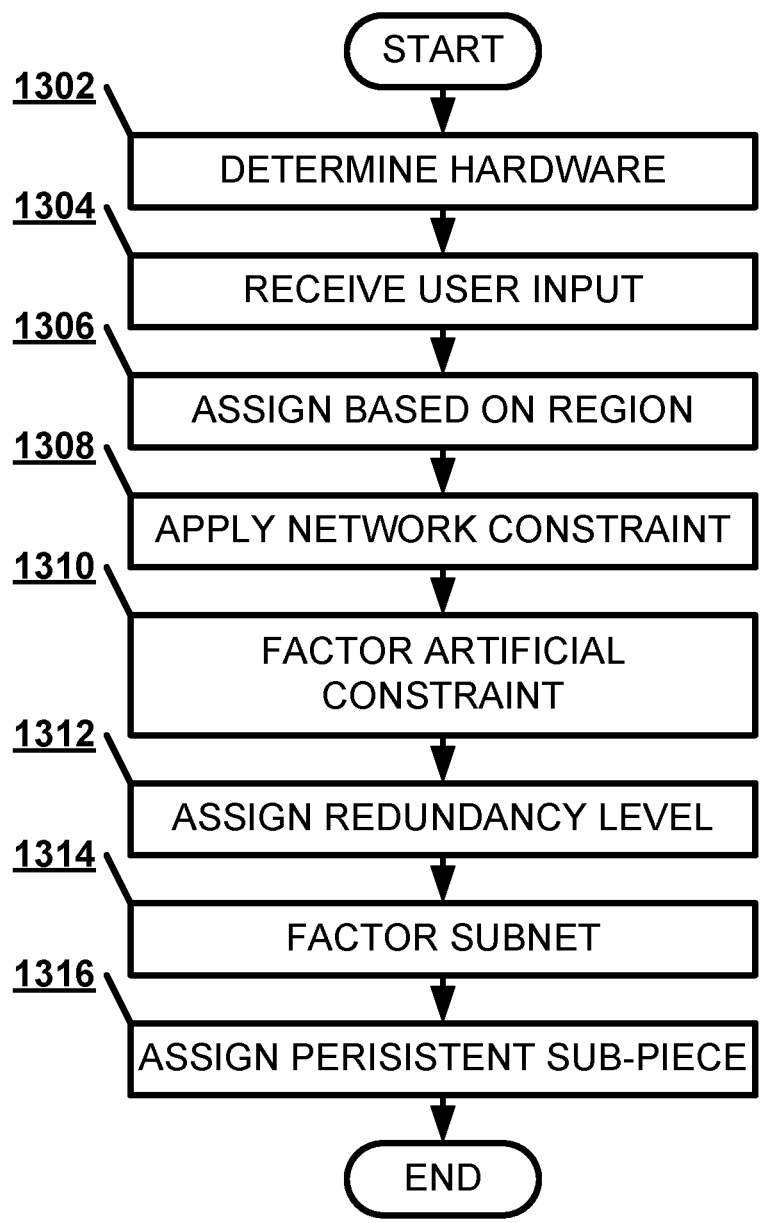
FIG. 13 illustrates, in a flowchart, one example of a method of managing device constraints on a catalog service.

FIG. 13 illustrates, in a flowchart, one example of a method 1300 of managing device constraints on a catalog service. The catalog service may determine a hardware constraint of the peer device describing at least one of memory, hard disk specification, and network bandwidth as a device constraint (Block 1302). The catalog service may receive a user input describing a user constraint as an artificial constraint for the peer device (Block 1304). The catalog service may assign a network service constraint based on a geographic region (Block 1306). The catalog service may apply the network service constraint as an artificial constraint for the peer device (Block 1308). The catalog service may factor the artificial constraint from an external source to the peer device into sub-piece seeding (Block 1310). The catalog service may assign a redundancy level for the seed sub-piece based on a network proximity of the leeching client (Block 1312). The catalog service may factor a network subnet into selecting the seed sub-piece (Block 1314). The catalog service may assign the persistent sub-piece based on the device constraint (Block 1316).

Figure 14:
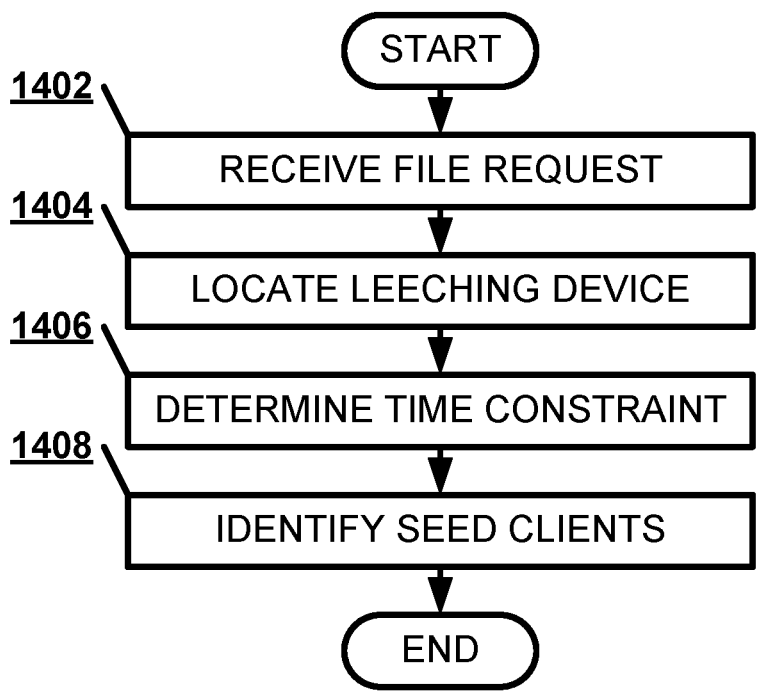
FIG. 14 illustrates, in a flowchart, one example of a method of providing a data file for a leeching device using a catalog service.

FIG. 14 illustrates, in a flowchart, one example of a method 1400 of providing a data file for a leeching device using a catalog service. The catalog service may receive a data file request for a data file from a peer device acting as a leeching device (Block 1402). The catalog service may locate the leeching device, either geographically or within the peer-to-peer network (Block 1404). The catalog service may determine a time constraint for the leeching device based on the location (Block 1406). The catalog service may identify to a peer device acting as a leeching device a set of seed clients on a peer subset of peer devices of the peer-to-peer network to acquire the data file (Block 1408).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A catalog service, comprising:
memory configured to maintain an active peer list for a peer-to-peer network describing active peer devices and to track a data file composed of a set of sub-pieces for the peer-to-peer network;
a processing core having at least one processor configured to
receive, from a peer device of the peer-to-peer network, a constraint describing a user-defined data storage limit available for seeding a subset of the sub-pieces of the data file, store the constraint received from the peer device, and based at least on the constraint received from the peer device, assign a seed sub-piece of the data file to the peer device when executing a seed client to provide the seed sub-piece to a leeching client on the peer-to-peer network; and a communication interface configured to direct the peer device to retain a persistent sub-piece on the peer device as the seed sub-piece for the peer device until a release event.

2. The catalog service of claim 1, wherein the set of sub-pieces comprises sub-pieces of equal data size.

3. The catalog service of claim 1, wherein the processing core is further configured to identify a device constraint for the peer device by determining a hardware constraint of the peer device describing at least one of memory, hard disk specification, and network bandwidth.

4. The catalog service of claim 1, wherein the processing core is further configured to identify another constraint for the peer device applied by a source external to the peer device.

5. The catalog service of claim 1, wherein the processing core is further configured to assign a network service constraint based on a geographic region.

6. The catalog service of claim 1, wherein the processing core is further configured to
identify the seed subset of sub-pieces of the data file for the peer device to retain based on the constraint received from the peer device.

7. The catalog service of claim 1, wherein the processing core is further configured to select the seed sub-piece based on a network proximity of the leeching client.

8. The catalog service of claim 1, wherein the processing core is further configured to assign a redundancy level for the seed sub-piece based on a network proximity of the leeching client.

9. The catalog service of claim 1, wherein the processing core is further configured to select the seed sub-piece based on a network subnet.

10. A computing device, having a memory configured to store a series of instructions that are executed by at least one processor to implement a catalog service application, the computing device configured to
maintain an active peer list for a peer-to-peer network describing active peer devices;
track a data file composed of a set of sub-pieces for the peer-to-peer network;
receive, from a peer device of the peer-to-peer network, a constraint describing a user-defined data storage limit available for seeding a subset of the sub-pieces of the data file;
store the constraint received from the peer device;
based at least on the constraint received from the peer device, assign a seed sub-piece of the data file to the peer device when executing a seed client to provide the seed sub-piece to a leeching client on the peer-to-peer network; and
direct the peer device to retain a persistent sub-piece on the peer device as the seed sub-piece for the peer device until a release event.

11. The computing device of claim 10, wherein the computing device is further configured to
identify a device constraint by determining a hardware constraint of the peer device describing at least one of memory, hard disk specification, and network bandwidth.

12. The computing device of claim 10, wherein the computing device is further configured to
identify another constraint for the peer device applied by a source external to the peer device, and
assign the seed sub-piece further based on the other constraint.

13. The computing device of claim 10, wherein the computing device is further configured to
assign a network service constraint based on a geographic region.

14. The computing device of claim 10, wherein the computing device is further configured to
apply a network service constraint as an artificial constraint for the peer device.

15. The computing device of claim 11, wherein the computing device is further configured to
assign the seed sub-piece based on the device constraint for the peer device executing the seed client.

16. The computing device of claim 10, wherein the computing device is further configured to
identify the seed subset of sub-pieces of the data file for the peer device to retain based on the constraint received from the peer device.

17. A machine-implemented method, comprising:
connecting with a peer device to a peer-to-peer network;
registering with a catalog service that manages a data file composed of a set of sub-pieces for the peer-to-peer network;
providing to the catalog service a constraint describing a user-defined data storage limit available for seeding a subset of sub-pieces of the data file;
receiving a seed directive from the catalog service indicating a seed sub-piece of the data file for the peer device when executing a seed client; and
storing a persistent sub-piece on the peer device as the seed sub-piece for the seed client until a release event.

18. The method of claim 17, further comprising:
identifying to the catalog service a device constraint for the peer device impacting an ability of the peer device to store the sub-piece of the data file.

* * * * *